Kiyoshi Inoue
INVENTOR.

Kiyoshi Inoue
INVENTOR.

BY Karl F. Ross
Attorney 3,513,014
METHOD OF AND APPARATUS FOR MAKING PYROLYTIC GRAPHITE
Kiyoshi Inoue, 100 Sakato, Kawasaki,
Kanagawa, Tokyo, Japan
Filed Mar. 1, 1967, Ser. No. 619,678
Claims priority, application Japan, Mar. 7, 1966,
41/13,905
Int. Cl. C01b *31/04;* F16c *33/16;* C23c *13/04*
U.S. Cl. 117—46
15 Claims

ABSTRACT OF THE DISCLOSURE

Method of making pyrolytic graphite by depositing same under nonoxidizing conditions and at temperatures sufficient to decompose a fluid organic vehicle wherein electric discharge promotes the uniform deposition of a layer of the graphite. A bearing produced in situ by the pyrolytic electrically-induced decomposition of lubricating oil.

---

My present invention relates to the production of pyrolytic graphite for use in electrodes (e.g. for electrochemical or electric-discharge machining of workpieces, electrochemical grinding devices, electric-arc apparatus) and all other applications in which relatively hard refractory graphite is desirable, as well as to apparatus for carrying out this method and a bearing system including a pyrolytic-graphite layer produced by this method.

In my copending applications Ser. No. 512,338 filed Dec. 8, 1965, Ser. No. 535,268 filed Jan. 19, 1966 (now U.S. Pat. No. 3,417,006), Ser. No. 562,857 filed July 5, 1966 (now U.S. Pat. No. 3,420,759) and Ser. No. 565,670 filed June 30, 1966, I describe electrochemical grinding systems making use of graphite wheels in which pyrolytic graphite is fused at elevated temperatures into a coherent electrode structure. In general, pyrolytic graphite, while having many uses, is a most convenient electrode material because of its relatively high hardness and chemical nonreactivity. It is employed, for instance, in battery systems, as a material for making crucibles and other places at which high temperatures and severe reaction conditions are prevalent. Much of the pyrolytic graphite used hitherto was formed by pyrolysis (thermal nonoxidising decomposition) of gaseous organic materials such as the lower alkanes, alkenes, and alkynes with the aid of heated substrates upon which the carbon deposits in the form of pyrolytic graphite. In physical characteristics, pyrolytic graphite resembles ordinary mined graphite in that it is a crystalline allotropic form of carbon with a hexagonal arrangement of the atoms. The pyrolytically deposited material, however, differs from the mined product in that it has a substantially greater compressive strength, almost twice that of the mined graphite. Other conventional methods of producing pyrolytic graphite include the heating of petroleum cokes in high-temperature electric furnaces (usually above 3000° C.) in the absence of air or other oxidizing media.

Conventional methods of producing pyrolytic graphite have certain disadvantages which limit their usefulness, thus when pyrolysis of an organic gas is carried out with only inductive heating of a core or wire substrate upon which the carbon is to deposit, it is found that the deposit is relatively irregular and is characterized by a multiplicity of protuberances. Furthermore, the deposition or pyrolysis rates are relatively slow and, indeed, much of the organic material decomposed by pyrolysis does not deposit coherently and tenaciously to the substrate.

It is, therefore, an important object of the present invention to provide an improved method of making pyrolytic graphite at higher rates, more economically, in more uniform deposits and in general with less care and difficulty by comparison with earlier systems.

Another object of this invention is to provide a method of uniformly depositing pyrolytic graphite upon irregular substrates for the coating of dies or the like.

Still another object of this invention is to provide an improved bearing system having low wear and operating costs.

These objects and others which will become apparent hereinafter are attained, in accordance with the present invention, by a method of making pyrolytic graphite which involves the heating of a substrate in the presence of an organic fluid capable of undergoing pyrolysis under high thermal activation in the absence of air to form a graphitic deposit upon the substrate; and effecting a discharge in the region of the substrate surface and/or applying a unidirectional field across the pyrolysis region to promote pyrolytic decomposition of the organic fluid, induce migration of the decomposition particles toward the substrate and ensure uniform deposition of the resulting graphite upon the substrate surface.

According to a more specific feature of this invention, an elongated substrate is disposed in circumferential spaced relation within a pyrolytic decomposition chamber composed of a conductive material and an organic gas (e.g. an alkane such as propane) is continuously fed through this chamber while the substrate is resistively or inductively heated to a temperature adapted to pyrolytically decompose the organic gas and cause a deposition of graphite upon the substrate or core. According to the principles of this invention, an electric corona-type discharge (possibly also a glow-type discharge) is effected between that substrate and a counterelectrode (e.g. the surrounding housing portions) in the pyrolysis region and substantially all along the substrate surface to increase the rate of deposition of the pyrolytic graphite and the uniformity of the resulting deposit. Thus it has been found that corona-type or glow-type "spatial" discharges in the pyrolysis region, under conditions of externally developed high thermal activation, promote the formation in the gas of species capable of forming the pyrolytic graphite, increase the rate of deposition of the graphite layer and improve the uniformity and crystal-growth rate therein.

An apparatus for carrying out this method according to the present invention, may comprise a cylindrical chamber uniformly spaced from a rod-shaped substrate across which a transformer step-down secondary is connected as a resistive heating current source. The transformer may have a high-voltage secondary connected to a rectifier, or some other high-voltage DC source may be used, the high-voltage direct current being applied between the conductive housing and the central rod to produce the corona-type discharge in the annular space surrounding the rod and between the latter and the housing. The rod may alo be heated, independently of or in addition to the resistive heating by an induction-heating coil disposed within the chamber. It is found that the resulting deposit is highly uniform by comparison with a deposit formed in the absence of corona discharge.

According to another aspect of the present invention, the deposition of pyrolytic graphite is carried out from a liquid organic vehicle, at least in part, by electric-discharge induced breakdown of an organic dielectric (e.g. kereosene or mineral oil) between the substrate and the counterelectrode. It appears that, under certain conditions to be discussed in greater detail hereinbelow, an intermittent arc-type electric discharge developed between the substrate and the counterelectrode creates the high thermal activation conditions which are critical to the present invention. Thus, as a spark-type discharge is applied across this gap (during the initial portion of each discharge pulse) the long-chain molecular structure of the organic dielectric is fragmented by dielectric stress, etc. to form gases such as alkanes in the gap. The latter are, in turn, broken down to charged fragments which appear to migrate electrophoretically toward the positively charged surface and deposit there as pyrolytic graphite. The spark discharge produced during each discharge cycle degenerates into an arc-type discharge which must be sufficient to sustain the high thermal condition until the deposition of the elemental carbon is ensured. It has been discovered that these critical conditions can be described in terms of the parameters of the pulse train. This pulse train may be of the type produced by a transistor or solid-state controlled rectifier pulse generator and should have an effective pulse frequency between 50 Hz. (cycles/sec.) and 50 kHz. (kc./sec.), with an effective pulse duration between 30 microseconds and 10 milliseconds (preferably 90 microseconds to 5 milliseconds) and an effective duty factor between 30% and 90% (preferably 40% to 80%). The discharge should be substantially uniform over all of the equally spaced regions of the substrate and to this end the counterelectrode is formed to the surface configuration or contour of the body to be coated. A mutual vibration can be established along the breakdown gap at sonic or ultrasonic frequencies and it is of advantage to apply a relatively low frequency unidirectional pulse across the gap and to superimpose thereon an alternating current of higher frequency. It is also possible, however, to superimpose the alternating current of high frequency (e.g. about 100 kc. per second) on a continuous direct current.

The principle of the present invention is, moreover, applicable to bearing systems in which a relatively thin layer of pyrolytic graphite is deposited in situ to serve as a wear-resisting lubricant-retaining element according to the present invention. In this case, a thin film of an organic lubricant is applied between the relatively rotating parts while intermittent arc-type discharge pulse trains are applied thereacross periodically (i.e. at intervals timed to reconstitute the thin graphite layer upon its removal by wear), the breakdown forming a graphitic deposit by the method described above. It has been observed that a frequency in the kilocycle range is suitable for the breakdown current which apparently effects a dielectric heating of the thin lubricant film to effect the formation of pyrolytic graphite. When the graphite-forming current is applied in a small-fraction of the on-time, e.g. at a ratio to the off-time of 1:55 for example, the graphite deposit is found to have a thickness measurable in the tens of microns and to eliminate substantially completely all wear as indicated by removal of metal from the bearing or journal surfaces.

The terms "high thermal condition" and "high thermal-activation conditions" as used herein are intended to describe conditions which are designed to generate sufficient kinetic energy in the presence of organic molecules and to so transfer this kinetic energy to them that a fragmentation and/or ionization occurs, thereby permitting an electric field to control migration of the fragments. These conditions must be maintained for a period sufficient to allow the fragments to reach the substrate prior to their recombination or decay and may be developed by spark or other heating techniques able to give rise to high kinetic energies.

The above and other objects, features and advantages of the current invention will become more readily apparent from the description and examples, reference being made to the accompanying drawing, in which.

Figure 1:
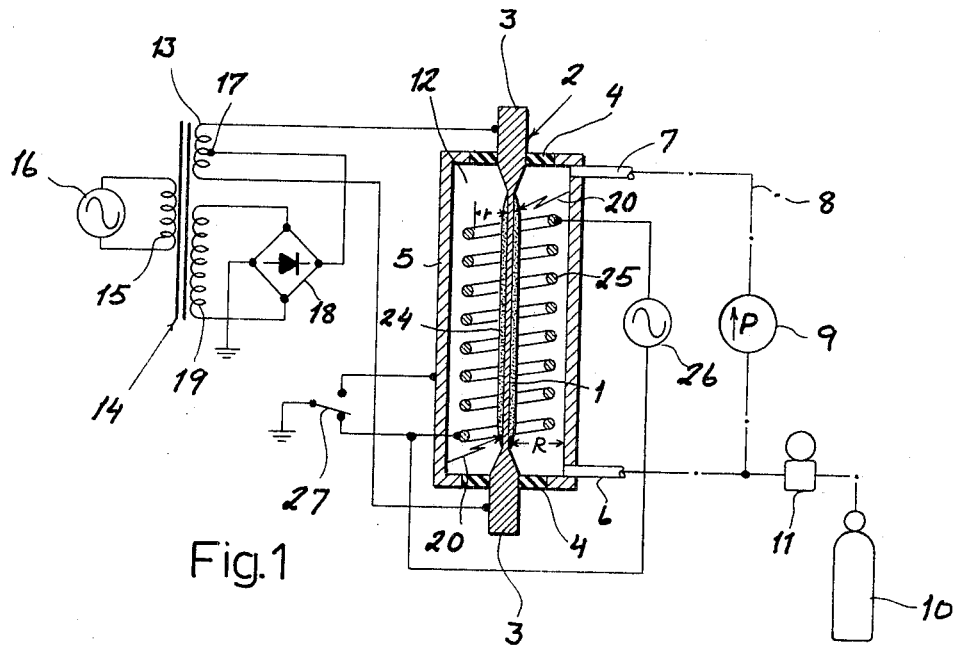
FIG. 1 is an axial cross-sectional view through an apparatus for producing pyrolytic graphite in accordance with the present invention.

In FIG. 1, I show an apparatus for forming a deposit of pyrolytic graphite upon a reduced-diameter portion 1 of a graphite rod 2 whose enlarged extremities 3 are received within electrically insulating disks 4 forming seals at the opposite extremities of a cylindrical metallic housing 5. The latter is formed with an inlet 6 and an outlet 7 through which a thermally decomposable organic gas, e.g. propane, can be circulated as represented by the conduits 8 and a circulation pump 9. The deficiency of gas is made up from a cylinder 10 which supplies additional propane or other thermally decomposable organic gas to the circulation system 5–9 via a pressure control 11 which ensures that pressure drops, as a consequence of consumption of the organic gas is compensated by further additions thereof.

As can be seen frim FIG. 1, the housing 5 of the pyrolysis chamber 12 surrounds the core 1 with circumferential clearance of uniform radius R. The core 1 of the rod 2 is heated from the step-down low-voltage, high current secondary winding 13 of a power transformer 14 whose primary winding 15 is energized by an alternating-current supply represented at 16. The secondary winding 13 is tapped and the center tap 17 is tied to the positive terminal of a rectifier bridge 18 whose negative terminal is connected to the housing 5 by grounding this terminal and the housing. The rectifier bridge 18 is, in turn, connected across the high-voltage secondary winding 19 of the transformer 14 which is adapted to deliver a potential sufficient to effect a breakdown between the relatively negative housing walls 5 and the core 1 which, in spite of the reversing current passing therethrough, always is at a higher positive potential than the housing 5. The result is a corona or glow discharge represented at 20 and extending substantially uniformly over the entire core 1.

While I do not wish to be bound by any theory as to why the corona discharge facilitates the uniformity of the deposition and improves the rate of formation of pyrolytic graphite, I attribute this phenomenon to an apparent ionization or fragmentation of the organic gases within the chamber 12 under such conditions as prevent their oxidation, to species negatively charged species under high thermal activation which migrate to the relatively positive core 1 and adhere to the core while growing upon the crystals of the previously deposited layer in a most orderly manner.

Figure 2:
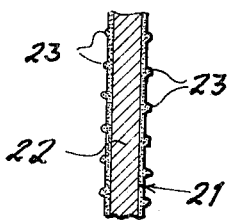
FIG. 2 is a cross-sectional view diagrammatically illustrating a deposit formed by conventional methods.
Figure 3:
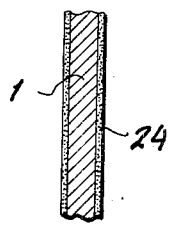
FIG. 3 is a view similar to FIG. 2 of the deposit formed by the apparatus of FIG. 1.

As can be seen from FIG. 2, the deposit 21 formed upon a core 22 by conventional techniques, i.e. absent the corona discharge but using resistive heating of the core 22, is irregular in that protuberances 23 cover the entire pyrolytic graphite layer 21 which is formed to a materially lesser extent in a given period of time than is the uniform deposit 24 of FIG. 3.

When resistive heating of the core 1 is not desired or a higher temperature of this core is preferred, I provide within the chamber 12 an inductive heating coil 25 which spaceably surrounds the core 1 at a uniform distance $r$. This coil 25 is energized by high frequency AC source 26. A switch 27 is provided to connect either the housing 5 or the inductive-heating coil 25 to ground. When the coil 25 is connected to ground and the housing 5 disconnected, a corona discharge is effected across the gap $r$ between the coil and the core 1. In this case, the coil constitutes the counterelectrode.

EXAMPLE I

Using the apparatus illustrated in FIG. 1, the core wire 1 was heated to 760° C. by 50-cycle alternating current, the core wire being of rectangular cross section and having a length of 50 mm., a width of 20 mm. and thickness of 2 mm. Ten liters per minute of propane is passed through the vessel 5 and a pyrolytic-carbon deposit of 25 microns per hour in thickness is observed.

When a 10 kilovolt corona discharge is applied between the chamber wall 5 and the core 1, the uniform spacing R between the core and the wall being 10 mm., the propane circulation can be increased to 20 liters per minute and a buildup of the uniform pyrolytic graphite layer is carried out at the rate of about 120 microns per minute. As a rule, it is found that the pyrolytic-graphite deposit formed in the absence of corona discharge is irregular and bumpy, whereas the use of corona discharge eliminates completely any surface irregularity. Furthermore, as a rule, the rate of buildup of the pyrolytic-graphite deposit is four to five times greater when corona discharge is employed.

When inductive heating of the wire to a temperature of 760° C. was used in place of resistive heating, the coil 25 was energized at 25 kilocycles per second. Substantially identical results were obtained when the inductive heating of the core was combined with corona discharge, the coil 25 in this case being uniformly spaced by the distance $r=10$ mm. from the core 1 and serving as the counter-electrode for the corona discharge.

Figure 4:
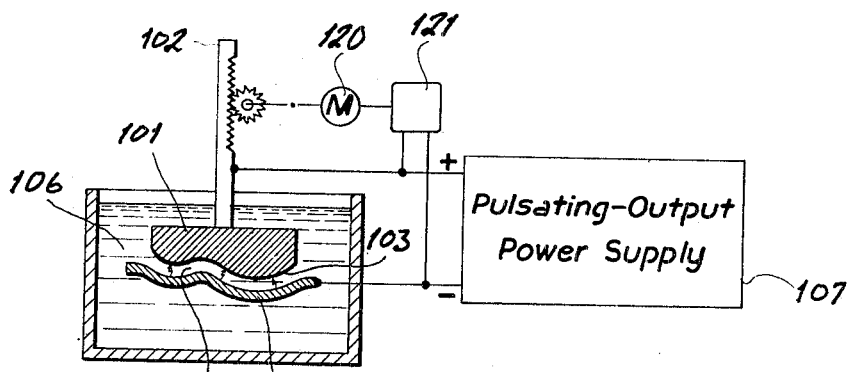
FIG. 4 is a cross-sectional view diagrammatically illustrating a system for applying pyrolytic graphite to a relatively broad surface in a liquid vehicle.

The system of FIG. 4 is designed to deposit a layer of pyrolytic graphite upon an electrode 101 which is formed by a shaped body carried by a stem 102. The shaped body 101 can be an electrode for use in electrochemical or electro-discharge machining or die-sinking of a workpiece to form a cavity complementary to the surface contour 103 of the body 101. To this end, the contoured surface 103 of the body 101 is juxtaposed with a counter-eletrode 104 of sheet metal, bent or molded with the aid of the body 101 or otherwise to contours complementary to those of the surface 103.

The gap 105 between the body 101 and the electrode 104 is flooded with an organic thermally decomposable dielectric liquid 106 which can be kerosene, a mineral oil or even sucrose or another organic substance dissolved in water. When an intermittent arc-type discharge pulse is generated across the gap between the relatively positive contoured surface 103 and the counterelectrode 104, a spark develops thereacross to create the high thermal-activation conditions required for fragmentation and ionization of the liquid which is partly converted to gas. Negatively charged particles rich in carbon are produced and appear to migrate electrophoretically to the positive electrode 103 across the gap 105 and add to previously deposited graphite crystals prior to decay of the pulse. A servomotor 120, operated by a gap-responsive control 121, maintains the spacing even during deposition. It has been observed that this carbon deposit is of the type generally considered to be pyrolytic graphite with respect to its hardness and physical properties. The power supply 107 may be a transistor or solid-state controlled rectifier pulse generator as described in my copending application Ser. No. 535,268 filed Jan. 19, 1966. Such a generator is capable of delivering an effective pulse frequency between 50 Hz. (cycles/sec.) and 50 kHz. (kc./sec.), as is critical for the intermittent arc-type discharge necessary to deposit pyrolytic graphite from the hydrocarbon liquid. The effective pulse duration should then be between 30 microseconds and 10 milliseconds and, preferably, between 90 microseconds and 5 milliseconds. The effective duty factor (ratio of on-time to total cycle, i.e. on-time+off-time) is 30% to 90% and, preferably, 40 to 80%.

Figure 5A:
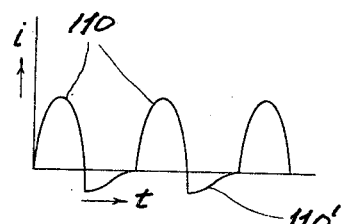
FIGS. 5A–5E are graphs showing waveforms of the electric current applied across the system of FIG. 4.
Figure 5B:
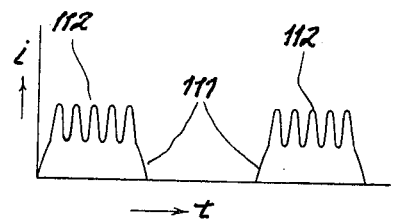
Figure 5C:
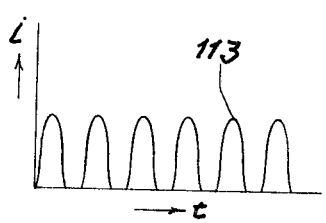
Figure 5D:
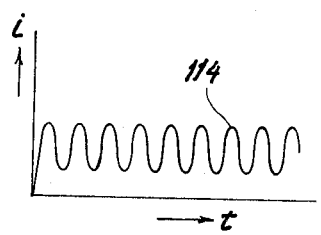
Figure 5E:
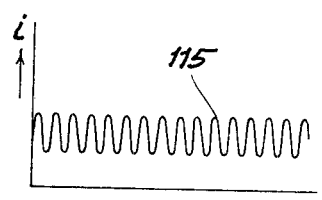

FIGS. 5A–5E illustrate waveforms particularly desirable for use as the supplied current for the device of FIG. 4. Thus, in FIG. 5A, a train of pulses 110 of uniform spacing such as may be obtained from impulsive discharges of a capacitor is employed. Between each pulse 110 there may be a slight current-flow reversal represented at 110'. In all of the graphs, the current applied across the gap is plotted as the ordinate, against time, as the abscissa. In FIG. 5B, I show a particularly advantageous current waveform for producing a unidirectional pulse upon which an alternating current pulse of lesser magnitude is superimposed. Thus, the high-current unidirectional (DC) pulses 111 at a rate of, say, 10 kilocycles per second are delivered and only during the duration of pulses 111 is an alternating current signal 12 superimposed. The high-frequency signal 112, which may have a frequency of about 10 times that of the main pyrolytic decomposition pulse train, may be 100 kc. per second. The ratio of the high-frequency power to the unidirectional pulse power can be about 1:1 with each constituting 50% of the integrated power supply. A high-duty-factor pulse train 113 as illustrated in FIG. 5C derived from a transistor or solid-state controlled rectifier pulse generator (see application Ser. No. 535,268) is also suitable. Here, too, the frequency may be between 50 cycles and 50 kc./sec. In FIGS. 5D and 5E the pulse trains 114 and 115 represent, respectively, the application of AC and the development of a self-rectification effect and an AC signal superimposed upon a constant DC signal. Both waveforms are similar in result.

EXAMPLE II

Using the apparatus illustrated in FIG. 4, with the substrate 101 constituted of iron and the counterelectrode 104 by a complementary copper sheet (150 mm. x 150 mm.) having a thickness of 15 mm., pyrolytic graphite was deposited from a hydrocarbon liquid 106 consisting of mineral oil.

The deposition and pyrolysis field applied by the power system was of the waveform illustrated in FIG. 5C corresponding to a mean voltage of 35 volts and a mean current of 1.5 amperes. The frequency of the pulses 110 was 5 kc./sec. and, after 30 minutes, a hard pyrolytic graphite layer of 0.2 mm. in thickness was discerned. The same deposition rate continued as long as the current was applied. An intermittent arc-type breakdown was observed across the gap which was on the order of microns.

Similar results were obtained when the dielectric liquid was a saturated solution of sucrose in de-ionized water. Furthermore, the uniformity of the deposit could be increased by superimposing 100 kc./sec. A-C upon a pulsating D-C of a frequency of 10 kc./sec. in accordance with the waveform illustrated in FIG. 5B. In this case, the ratio of the A-C power to the pulsating D-C power (mean) was 1:1.

Figure 7:
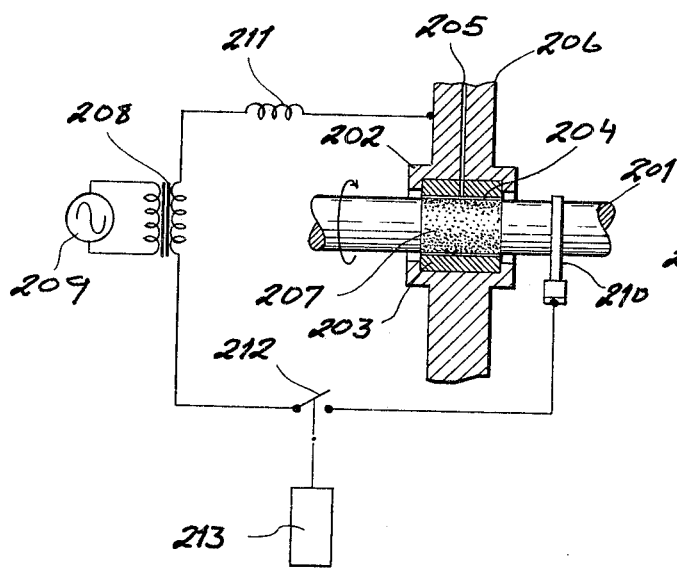
FIG. 7 is a cross-sectional view taken generally along the line VII—VII of FIG. 6.
Figure 6:
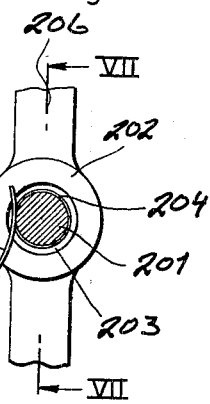
FIG. 6 is a diagrammatic cross-sectional view of a bearing system according to this invention.

In FIGS. 6 and 7, I show a modified arrangement whereby the in-situ deposition of pyrolytic graphite forms a bearing surface which decreases the wear between a rotatable member and a relatively stationary bearing member. In this system, the shaft 201 is surrounded by a bearing holder 202 whose bushing 203 may be composed of bronze or any other bearing material. An oil film is fed to the minute gap 204 between the bushing 203 and the shaft 201 via a bore 205 in the bearing holder 206. The shaft 201 may be the drive or driven shaft of a motor or any mechanical device and is formed along its surface with a pyrolytic-graphite zone 207 as set forth in the following example. The means for producing the decomposition of the organic vehicle includes a power transformer 208 energized by an A.C. current 209 and adapted to be applied across the shaft 201, via a wiper or brush 210, and the bearing assembly 203–206 via an inductance 211. The switch 212 connecting the power supply 208 etc. in circuit with the gap 204, is operated by a timer 213.

EXAMPLE III

Using the system illustrated in FIGS. 6 and 7, a wear-resistant friction-reducing film 207 of pyrolytic graphite was formed in situ by pyrolysis of mineral oil. The shaft 201 had a diameter of 55 mm. and was surrounded by a bearing bushing 203 containing 80% by weight copper and 20% by weight tin, the bushing being held by a radial pressure of 25 kg./cm.$^2$ against the shaft. The latter is rotated at 1750 r.p.m. and a lubricant (Mobil lubricating oil) is supplied to the interface. The bearing system was operated with the electrical pyrolysis current having an "on" time of 1 minute and an "off" time of 55 minutes for a total period of 500 hours. The frequency supplied by the pulse-current source was 8.5 kc./second at a peak current of 7.5 amp. and a pulse duration of 55 microseconds. After the 500 hours of operating under these conditions, a black-colored layer 207 was discerned on the shaft which, upon microscopic examination, was found to be a 60-micron layer of pyrolytic graphite. Neither the bearing bushing 203 nor the shaft 201 showed any signs of wear. Experiments were carried out with a wide range of pulse durations and it was found that similar results were obtained with pulse durations of 30 microseconds to 5 milliseconds and corresponding pulse spacings. Preferably pulses of the type illustrated in FIG. 5 are used with the shaft relatively positive.

When the system was operated for 500 hours without passage of the pyrolysis current, there was noticeable pitting of both the bronze-bearing bushing and the steel shaft.

I claim:
1. A method of depositing pyrolytic graphite upon a substrate, comprising the steps of:
   (a) subjecting an organic compound under nonoxidizing conditions to thermal breakdown of said compound and the formation of elemental carbon; and
   (b) generating an electric field in the region of the thermally decomposing organic compound between the substrate and a counterelectrode of an intensity sufficient to create a corona-type electrical discharge and induce deposition of said elemental carbon as pyrolytic graphite upon said substrate, said electric field being so poled as to render said substrate relatively positive and said counterelectrode relatively negative.

2. The method defined in claim 1 wherein said gas is circulated between said substrate and said counterelectrode.

3. The method defined in claim 2 wherein said substrate is generally elongated and said counterelectrode is a chamber surrounding said substrate with uniform spacing therefrom and said corona-type discharge passes between the walls of said chamber and said substrate, said substrate being heated independently of said electric field by an electric heating current.

4. The method defined in claim 2 wherein said substrate is resistively heated by passing an electric current therethrough.

5. The method defined in claim 4 wherein said substrate is heated by applying thereto an inductive heating field.

6. A method of depositing pyrolytic graphite upon a substrate, comprising the steps of:
   (a) subjecting an organic compound under nonoxidizing conditions to thermal breakdown of said compound and the formation of elemental carbon; and
   (b) generating an electric field in the region of the thermally decomposing organic compound between the substrate and a counterelectrode to create an electrical discharge and induce deposition of said elemental carbon as pyrolytic graphite upon said substrate, said electric field being so poled as to render said substrate relatively positive and said counterelectrode relatively negative, said organic compound being a dielectric organic liquid, said electric field applying intermittent arc-type pulses with a frequency between 50 Hz. and 50 kHz.

7. The method defined in claim 6 wherein said electric field has a Hz. pulse duration between 30 microseconds and 10 milliseconds and a duty factor of 30% to 90%.

8. The method defined in claim 6 wherein said substrate has a contoured surface, further comprising the step of bending said counterelectrode to a configuration complementary to that of the contoured surface.

9. In a method of operating a bearing system wherein a moving member is shiftable relatively to a bearing member with frictional contact of said members at a mutual interface, the improvement which comprises, in combination, the steps of:
   (a) applying a film of an organic lubricant to said interface between said members whereby said film is maintained under pressure between said members; and
   (b) at least intermittently applying an electric field across said members of an intensity sufficient to create an electrical discharge to pyrolytically decompose said film and deposit pyrolytic graphite upon at least one of said members to limit mutual wear thereof.

10. The improvement defined in claim 9 wherein said electric field has a frequency between substantially 50 Hz. and 50 kHz.

11. The improvement defined in claim 9 wherein said field generates an intermittent arc-type electric discharge through said film and is applied across said members for a small fraction of the duration of operation of the bearing system.

12. An apparatus for depositing pyrolytic graphite upon a substrate, comprising housing means surrounding said substrate and forming a chamber; means for circulating a thermally decomposable organic gas through said chamber; means for heating said substrate for pyrolysis of said gas within said chamber; and including a source of electrical pulses with a frequency of 50 Hz. to 50 kHz. connected across said substrate and said housing means for applying an electric field across the gas within said chamber with said substrate rendered relatively positive to facilitate uniform deposition of pyrolytic graphite upon said substrate of a level sufficient to effect a corona discharge in said chamber.

13. The apparatus as defined in claim 12 wherein said means for heating said substrate includes an induction coil within said chamber surrounding said substrate.

14. The apparatus as defined in claim 12 wherein said means for heating said substrate includes a source of electric current connected across said substrate for resistively heating same by the passage of said current therethrough.

15. A bearing system comprising a rotating shaft, a bearing bushing surrounding said shaft with interposition of a pyrolytically decomposable lubricant therebetween and rotatably supporting said shaft, and means for intermittently applying a pyrolysis electric current across said shaft and said bushing of an intensity sufficient to generate an electric discharge and deposit pyrolytic graphite from said lubricant on one of said shaft and said bushing.

References Cited

UNITED STATES PATENTS

| | | | |
|---|---|---|---|
| 382,560 | 5/1888 | Seel | 117—93 X |
| 3,072,444 | 1/1963 | Klass | 308—1 |
| 3,138,434 | 6/1964 | Diefendorf | 117—226 X |
| 3,142,158 | 7/1964 | Podolsky. | |
| 3,167,449 | 1/1965 | Spacil | 117—226 X |

FOREIGN PATENTS

| | | |
|---|---|---|
| 830,379 | 3/1960 | Great Britain. |

ALFRED L. LEAVITT, Primary Examiner

J. H. NEWSOME, Assistant Examiner

U.S. Cl. X.R.

23—209.3, 209.4; 117—93.1, 93.2, 106, 226; 118—620; 184—1; 204—173; 308—1, 78